United States Patent [19]

Vinsonneau et al.

[11] Patent Number: 5,319,745

[45] Date of Patent: Jun. 7, 1994

[54] METHOD AND APPARATUS FOR PROCESSING ALPHANUMERIC AND GRAPHIC INFORMATION TO CREATE A DATA BASE

[75] Inventors: Daniel Vinsonneau, Le Cannet; Jean-Francois Plantier, Nice; Isabelle Finck-Bertheux, Roquefort-Les-Pins, all of France

[73] Assignee: Aerospatiale Societe Nationale Industrielle, Paris Cedex, France

[21] Appl. No.: 945,689

[22] Filed: Sep. 16, 1992

[30] Foreign Application Priority Data

Sep. 16, 1991 [FR] France .................... 91 11378

[51] Int. Cl.$^5$ .......................................... G06F 15/62
[52] U.S. Cl. ................................... 395/144; 395/145
[58] Field of Search ................ 395/144, 600, 145; 364/419

[56] References Cited

U.S. PATENT DOCUMENTS

| | | | |
|---|---|---|---|
| 4,205,780 | 6/1980 | Burns et al. | 235/454 |
| 4,468,809 | 8/1984 | Grabowski et al. | 382/50 |
| 4,653,021 | 3/1987 | Takagi | 395/600 |
| 4,672,186 | 6/1987 | Van Tyne | 358/464 |
| 4,685,068 | 8/1987 | Greco et al. | 364/518 |
| 4,760,526 | 7/1988 | Takeda et al. | 395/600 |
| 4,878,123 | 11/1989 | Miura et al. | 358/401 |
| 4,941,125 | 7/1990 | Boyne | 395/600 |
| 4,942,621 | 7/1990 | Angwin | 382/59 |
| 4,985,863 | 1/1991 | Fujisawa et al. | 395/600 |
| 4,991,087 | 2/1991 | Burkowski et al. | 395/600 |
| 5,140,139 | 8/1992 | Shepard | 395/142 |

FOREIGN PATENT DOCUMENTS 0251237 1/1988 European Pat. Off. .

OTHER PUBLICATIONS

Hinds, S. C., "A Document Skew Detection Method Using Run-Length Encoding and the Hough Transform" IEEE 10th Int. Conf. Pattern Recognition Jun. 1990.

Cooper, A., "Image Processing for Electronic Document Storage", (IEEE Apr. 1988).

Fletcher, L.A., "A Robust Algorithm for Text String Separation from Mixed Text/Graphics Images", IEEE Transactions on Pattern Analysis and Machine Intelligence, vol. 10, No. 6 (Nov. 1988) pp. 910-918.

James L. Fisher, Stuart C. Hinds, Donald P. D'Amato, "A Rule Based System for Document Image Segmentation", Jun. 16, 1990, pp. 567-572.

G. Ciadiello, "An Experimental System for Office Handling and Text Recognition", 1988, pp. 739-743.

K. Y. Wong et al., "Document Analysis System", 1982, pp. 496-500.

*Primary Examiner*—Heather R. Herndon
*Assistant Examiner*—N. Kenneth Burraston
*Attorney, Agent, or Firm*—Hayes, Soloway, Hennessey, Grossman & Hage

[57] ABSTRACT

The invention concerns a method and an apparatus for processing alphanumeric and graphics information recorded in page form on a system to create a data base which can be searched and edited, wherein the following steps take place automatically:

A) determination of digitized page images;

B) a first phase of processing digitized page images providing: verification that these pages are sequential, determination of the characteristic elements on each page, determination of the angle of deviation, mask formation, window formatting, alignment correction, identification of characteristic elements, image segmentation; recording in separate files the digitized page images, the digital image entities and the digitized segmented images accessible for editing;

C) a second processing phase consisting of optical character recognition of the components relative to the alphanumeric data from the segmented images and recording the data in a file to create a data base which can be searched.

10 Claims, 7 Drawing Sheets

METHOD AND APPARATUS FOR PROCESSING ALPHANUMERIC AND GRAPHIC INFORMATION TO CREATE A DATA BASE

The invention concerns a method and an apparatus for processing alphanumeric and graphics information recorded on a system in page form to create a documentary data base which can be searched.

The term "system" refers to media for processing data such as paper documents, which will hereafter be called catalogs, or electronic recording means such as CD-ROM's.

Note that the data in such a system is generally in the form of A4 and B5 page format.

Accessing a documentary data base stored in a mainframe or a computer is done by entering key words or codes on an electronic device such as a computer. These devices may be networked to the mainframe when the data base is operated by a mainframe.

When a document is recorded in a data base, it has been previously undergone processing. When there is a considerable volume of material, this consists of inputting the data manually with a keyboard or electronically with a camera or scanner so that each page is recorded in pixel matrix format.

The currently used English term "bitmap" translates what is meant here by a "pixel matrix".

All of these processing procedures apply to alphanumeric and graphics data and are completed by final processing which transforms the pixel matrices representing the text into a format such as ASCII code.

This transformation consists of optical character recognition. The data is then recorded in one file by a terminal or by any other computer to create a data base which can be searched.

Although numerous methods have been used for character recognition (particularly in the computer assisted design field), there is none which is satisfactory for use in searching a data base by key word, due to the high incidence of error resulting after editing the research results.

By way of example, reference may be made to the following state of the art patents:

U.S. Pat. No. 3,950,733, Apr. 13, 1976 by Cooper et al.,
U.S. Pat. No. 4,044,243, Aug. 23, 1977 by Cooper et al.,
U.S. Pat. No. 4,254,474, Mar. 3, 1981 by Cooper et al.,
U.S. Pat. No. 4,319,331, Mar. 9, 1982 by Elbaum et al.,
U.S. Pat. No. 4,326,259, Apr. 20, 1982 by Cooper et al.,
U.S. Pat. No. 4,760,604, Jul. 26, 1988 by Cooper et al.,
U.S. Pat. No. 4,897,811, Jan. 30, 1990 by Scofield,
U.S. Pat. No. 4,926,064, May 15, 1990 by Tapan,
U.S. Pat. No. 4,958,375, Sep. 18, 1990 by Reilly et al.,
U.S. Pat. No. 4,760,606, Jun. 30, 1986 by Lesnick et al. which describe trial algorithms using neural networks to achieve character recognition.

Reference may also be made to the following state of the art documents which comprise the technological background of the invention:

Archimag, No. 27, 1989, entitled "La documentation de presse a Paribas" ("Publication Documentation in Paribas") by Louise Guerre, which concerns electronically archiving published articles to eliminate paper support;

ET L-0345, Nov. 28, 1983, entitled "A Test Strategy for High Resolution Image Scanners" by Armin W. Gruen, Ohio State University, 1958, Neil Ave., Columbus, Ohio 43210, concerning a study of the principal flaws in scanners and associated test methods;

International Update, May/June 1987, entitled "New Technologies Demand New Standards for the Quality Control of Microfilm Images of Engineering Drawings" by Eric T. Wilson, which concerns microfilm quality control and the microfilm scanning method of converting information into digitized form;

INFORM, September, 1989, entitled "Getting to the Source" by Phyllis H. Bruce, The Babcock & Wilcox Company, Nuclear Power Division, concerning a theoretical study of the method for producing documents of quality sufficient for effective microfilm storage;

INFORM, May, 1988, entitled "Putting a Scanned Document Database to Work" by Berle E. Larned, directed to a discussion of the interest in electronic document archiving, their regular retrieval, the interest in character recognition techniques; suggests indexing the documents from the ASCII base obtained;

INFORM, July/August, 1990 entitled "Small Wonder in Delaware" by Cheryl Butler which concerns transforming to digitized format the information recorded on microfiche in order to record it on optical discs; this document discloses employing thirty-six people to scan the documents and create the data base; this base was created manually using visual inspection and consists of 4,000,000 pages.

INFORM, July/August, 1990 entitled "Arco Products Produces" by Gregory E. Kaebnick, which concerns optical storage of drawings, manual indexing, electronic and manual quality control of 100,000 pages (a project which took ten people two years to accomplish);

Information Media & Technology, Volume 23, No. 1, entitled "Freedom 30: Scanner-Independent ICR from Kurzweil", which concerns a presentation and experiments on a system for a PC made by XEROX; the optical character recognition technique yields 99.7% correct results in the best cases, tolerates 3% rotation, scans images without the need for any other processing of the digitized data obtained.

Special Report, May/June 1988, entitled "Scanning, OCR Devices Complement Microfilm in Solving Data Entry Bottlenecks" by Michael C. Bida which concerns generalities about electronic archiving, the optical character recognition technique, text/image separation and automatic indexing of documents archived on microfilm;

9th International Conference on Pattern Recognition (Nov. 14, 1988, Rome, IT, pages 739-743; G. CIARDIELLO: "An Experimental System for Office Document Handling and Text Recognition";

6th International Conference on Pattern Recognition (1982, Munich, Germany, pages 496-500); K. Y. WONG et al.: "Document Analysis System").

Reference may also be made to the document entitled *Annals of the CIRP* Vol. 38/1/1989 describing a technique of scanning and automatically interpreting technical drawings for CAD (computer-aided design) without reference to character recognition techniques.

Additionally, documents used for a data base may comprise not only alphanumeric characters, but also graphics (drawings). At the present time, data bases are not generally used for large volumes of text accompanied by graphics. When this is the case, there is a problem with poor text quality after editing since the data obtained after scanning the graphics is what is used for editing.

Even though methods for storage of alphanumeric and graphics data do exist, they are generally reserved for storing graphics such as topographical maps.

By way of example, reference may be made to the IEEE document "Transaction on Pattern Analysis and Machine Intelligence", Vol. II, No. 3, December, 1989, in which there is described a method of segmenting images in order to store and access maps and drawings. The segmentation depends upon levels of gray color to highlight particular details with a statistical method and has no relation to the concept of segmentation as it relates to the present application.

Reference may also be made to the state of the art described in International Patent Application WO90/09717 dated Aug. 23, 1990, in Application GB 2 191 281 A and in European Application 0 258 577, which describes methods for processing and storing alphanumeric data or drawings which are not adapted to the formation of a data base (exact reproduction of original document) forming part of a telecommunications network which can be searched from a remote location.

The disadvantage of such methods arises first from the high incidence of errors, and additionally from the fact that they are very sensitive to flaws which may exist in the text, such as poor character formation, non-parallel text lines or smudges.

Furthermore, it is also possible at the present time to be able to access portions of the contents of a document or catalog, in other words, to edit paragraphs located anywhere within the catalog.

Present processing methods make it possible to access the first page of a file or the beginning of a page, but not particular paragraphs of a page or catalog.

All of these specific disadvantages are encountered in one specific instance, that of creating a patent data base.

An article entitled "A Rule-Based System for document Image Segmentation" by J. L. Fisher, S. C. Hinds and D. P. D'Amato (10th International Conference on Pattern Recognition, Jun. 16, 1990, Atlantic City, U.S., pages (567–572) describes and suggests the following sequentially executed operations:

digitizing by means of a scanner;
correcting parallax by rotation (or the equivalence of rotation) of the image;
window-formatting;
segmentation;
cut-and-paste;
storage on magnetic media.

To effectively window-format a particular document located inside a digitized page it seems clear to correct orientation of the image and to window-format the document afterward. Otherwise, the text may be diagonally split after window-formatting.

The documents we have for digitizing all have a horizontal indicator which allows us to calculate the angle of rotation. The window extracted from a page is thus inclined at this angle, thereby permitting it to be extracted without the need to rotate the whole page. A segmentation could therefore be accomplished without such rotation. This is the object of the present invention.

The description of the invention which follows is intended to be illustrative and in no way to limit its application to this specific example.

The present invention, therefore, has as its goal overcoming the problems described above.

These problems are the following:
digitizing irregularities;
scanner regulation problems;
quality of digitizing;
manual indexing;
manual execution of regulation control;
poorly indexed original digitized document (when the Optical Character Recognition (OCR) has generated a spelling error).

The present invention offers a solution for limiting these problems.

The object of the present invention is a method for processing alphanumeric and graphic data for creating a data base which can be searched by key word or by the identification number of the portion to be consulted, said search being performed on a file generated by character reading techniques, and the editing of the consulted document taking place within another file generated before any character reading process occurs (BITMAP file image of original document).

More specifically, the object of the present invention is a method for processing alphanumeric and graphics data stored in a system in page format to create a data base which can be searched using searching techniques and to allow data editing using editing means, characterized in that it comprises the following automatic steps:

A) creating digitized page images in pixel matrix form from the alphanumeric and graphics data record in the system;

B) a first phase of processing the digitized page images, comprising:
verification that the pages are in proper sequence;
identification of the characteristic elements on each digitized page image so the information may be cut in blocks and identification of page markers;
calculation to determine the angle of rotation which must be applied to each portion of the digitized image comprising text only in order to properly orient it;
for certain characteristic elements on each digital page image, making a mask of what is anticipated on the next page;
window-formatting, from these characteristic elements and these page markers, blocks of information contained on one or more pages relative to the same portion and creating a digitized page by portion;
correcting the alignment of text lines from the characteristic elements previously identified;
identifying characteristic elements for each digitized portion relating to an image by comparison with the anticipated masks which have been calculated in advance;
segmenting the images so as to identify the fields corresponding to portions of their contents so they may be separately recorded and recomposed according to the desired page location;
recording the digitized page images, digitized image portions and digitized segmented images as files which can be edited;

C) a second processing phase consisting of optical reading of the field characters relating to the alphanumeric information from the segmented images and recording this data in a file comprising a data base which can be searched.

According to another advantageous characteristic, step A further comprises a pre-indexing step consisting of determining the number of pages in the initial digitized document and the numbers of the first and last portions in said document.

According to another advantageous characteristic of the invention, the method further comprises a step which consists of rectifying alignment of the text lines from the characteristic elements previously determined (cf. FIG. 4).

According to another advantageous characteristic of the invention, alignment correction consists of effecting one or more transformations of the image, resulting in rotation through the desired angle. If there are two transformations, one is vertical and the other horizontal so there is variable spacing along the lines and the columns, ultimately resulting in lines of text which appear parallel to one another.

According to another characteristic of the invention, the method comprises a step during which the digitized images are compressed at the end of the first treatment.

According to another characteristic of the invention, step A, in the case of a printed catalog, consists of automatically scanning the information page by page to generated the digitized page images.

According to another characteristic of the invention, step A, in the case where the data is on CD-ROM and consists of stored digitized pages, consists of decompressing the digital data to produce digitized page images.

According to another advantageous characteristic, processing takes place in real time.

Other details and advantages of the invention will be apparent from the description, which is intended to be illustrative and in no way to limit the scope of the invention, and from the drawings, in which.

The various steps in the method according to the invention will be presented using the specific application of creating a data base for patent applications. It is clear that the invention also concerns creating a data base relating to other types of documents (for example, newspapers, periodicals, . . . etc.)

In the remainder of the description, the media used may be catalogs or CD-ROM's, with the understanding that for this particular application the catalogs will be published anthologies of documents, for example patents, such as the *BOPI*, the *Official Gazette*, etc.

The printed information in various catalogs consists of descriptive abstracts of patent applications and administrative information such as, for example, information indexing the title, one of more classification codes and/or the applicant. This method also applies to trademarks and designs which are structured comparably to patent information.

The term "portion" refers to the descriptive patent abstract, the portion in this case being identified by the corresponding patent number and preferably the classification number relating it to a patent family. Thus, each portion is indexed.

The alphanumeric information printed in the patent catalogs corresponds to administrative information relative to each patent, generally consisting of a descriptive abstract of an invention and a drawing.

Figure 1:
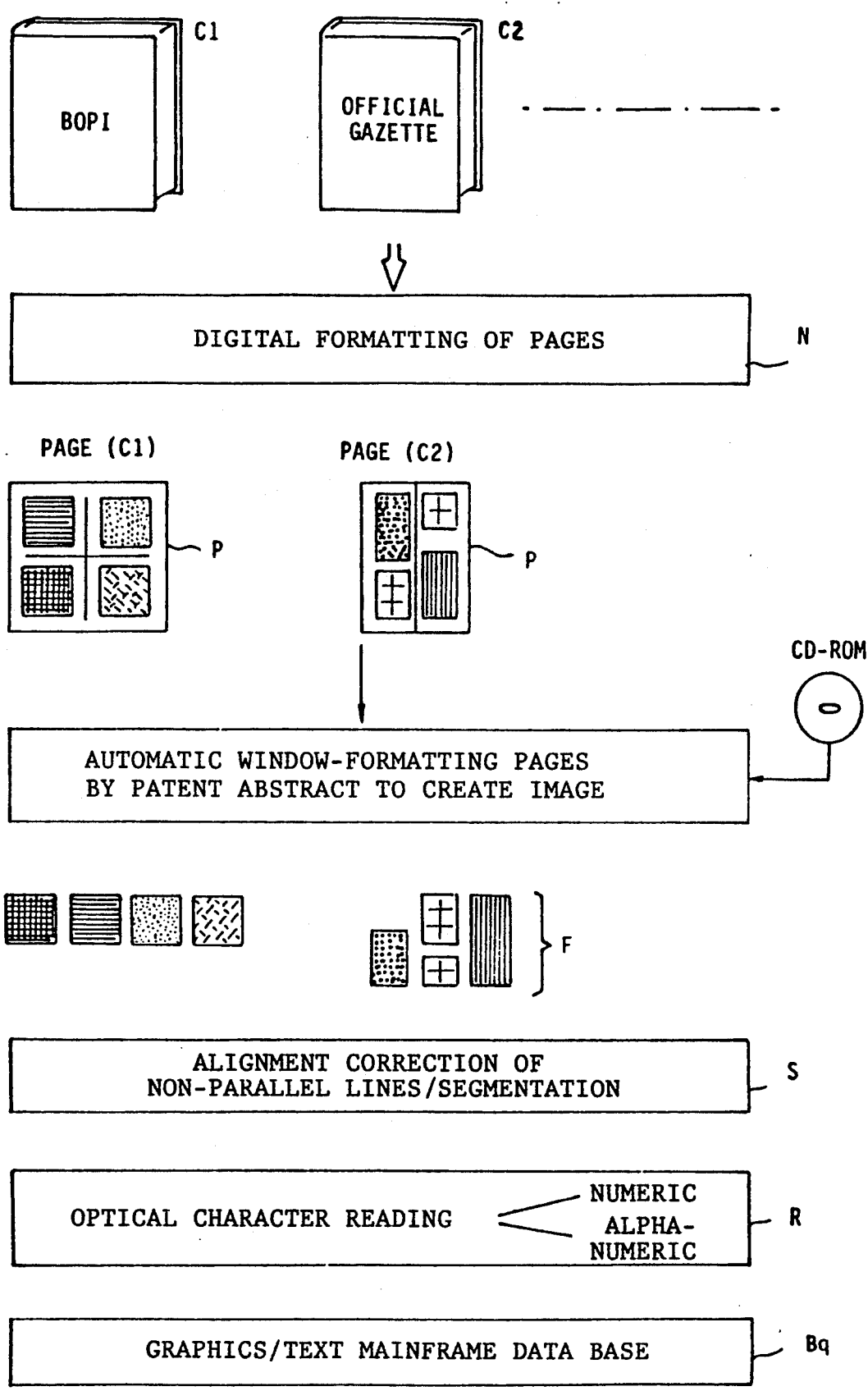
FIG. 1 is a schematic illustration of the principal steps of the method in a specific application.

FIG. 1 is a schema showing the various types of storage media C1, C 2 and CD-ROM from which the data to be processed in accordance with the method is retrieved.

In the case of paper support, one proceeds to transform the pages into digitized format (after treating the catalogs with lead oxide) using a scanner (step N in FIG. 1), the digitizing procedure preferably being automatic if there is a considerable volume of text.

An automatic paid page feed scanner is preferably chosen, which also provides automatic brightness control to adapting to paper color.

This is how the digitized page images are generated, said digitized page images being in bitmap form (pixel matrices).

A single page may comprise various portions and one portion may be split among different blocks on the same page or even on two successive pages (P, FIG. 1).

Furthermore, putting each catalog into page format, that is, presenting the abstracts in different blocks, varies according to catalog type.

In accordance with the invention, a processing procedure called automatic window-formatting takes place, resulting in a bitmap image by information block, with the concatenation among the blocs enabling bitmap imaging to take place by portion, that is, by patent abstract.

In the case of magnetic or optical media support, for example a CD-ROM, transfer into digitized format will have already taken place and the processing stage preceding the window process consists only of decompressing the data by any known decompression algorithm compatible with the compression algorithm used.

Following the window-formatting process F, the method consists of effecting alignment correction of the text lines and also of image segmentation (S, FIG. 1). This segmentation consists of processing each image, resulting in different page positioning, which takes place by identifying portions of the contents, i.e., fields of data which are paragraphs or a drawing.

This identification is accomplished using an image processing step known in the art, of indexing the beginnings or ends of paragraphs by counting pixels.

In addition, as will be described hereafter, various other characteristic page elements will be identified during processing which will allow the processing to correct alignment of text lines, for example.

After the segmentation process, rotation is effected on only small portions of text. The size of the rotation matrix is thus much smaller than if an entire page were turned around. The size of this text portion has no parasitic contour; it consists of text only, and areas devoid of text are eliminated. Drawings recognized as such do not undergo rotation. This segmentation is performed on the entirety of text contained in a page. Several text fields are thus detected by the segmentation program.

The segmentation program generally is able to differentiate text from drawings or graphics, as is known in the art, and numerous publications exist on this subject.

However, in the case of monochromatic text or drawings, digitizing takes place without gradations of gray color (pixels are black or white), which conserves memory storage space. Rotation would cause aberrations, as it is not possible to easily redistribute certain pixels which may have been read as "white" while nevertheless containing a non-negligible percentage of black, with this information being lost. The drawing is window-formatted but no rotation operation is applied to it. This results in a time gain (reducing rotation time) and no corruption resulting from rotation.

The total of these rotation times is less than that of global page rotation, since rotation occurs only for the portions of text with no margin and does not include the drawing. This is significant, as rotation time is very important in rotating a 3307 by 4677 matrix, which is the size of a page 21 by 29.6 centimeters with 400 DPI. Matrix size requires the use specialized boards having sufficient memory and accelerated processing speed in the computers controlling the scanners (PC, SUN type). This problem is known today and has been overcome with the use of transputers. Our method may eliminate the use of these transputers.

The principle of automatic document indexing is known, but in use it poses the following problems:
time required to index;
index reliability;
its inclusion in a particular program.

What is currently known is based on the use of an Optical Character Recognition (OCR) program. A masking technique is much more reliable and more quickly executed. During digitizing, a first inspection pass consists of verifying that the digitized pages are sequentially present to determine which pages are missing. The documents to be digitized in our case are known and thus the character fonts, which remain the same, are also known. The page number is located in a particular position on these pages and increases sequentially for each new page digitized. Thus, it is possible to make a "bitmap" image of the page number one expects to find on the next page and to apply a comparison between the number of the window-formatted page and the anticipated number, calculated in advance. This method offers the following advantages:
simplicity,
generally higher reliability than OCR programs;
faster processing time
ease of incorporation in a specific computer program.

However, it is of utmost importance to carefully verify by visual inspection in real time that page "X" is in fact missing, and that the scanner has not processed several pages at once. With a rapid scanner (several thousand pages per hour), this operation must take place in real time without relying on specialized processors.

Note that the OCR has a higher recognition rate when characters have been straightened, which increases the time required for digitizing if rotation takes place in real time simultaneously with digitizing. Additionally, previous knowledge of the character font also leads to an improved character recognition rate by the OCR program. We know by calculation the angle needed to be applied to align the page, and we also know the anticipated number of the page undergoing digitizing. Within inspection exactness limits it would be possible to generate fonts for each angle (with an increment of one one-hundredth of a degree, for example) in a range of from $-5°$ to $+5°$. It is also possible to rotate the bitmap composed of these characters. This is not important in light of the fact that only ten digits exist. Because of this technique, inspecting page numbers for a small amount of material can be achieved in real time.

Similarly, the patent application numbers published in the gazettes of various countries are sequential, which means that for a considerable percentage, depending upon document type, the patent application number (which is the indexing key) is known for the document undergoing processing. This provides an additional advantage to page number recognition.

The following step consists of effecting optical character recognition of the fields previously generated (R, FIG. 1).

Thus, separate files are created for the digitized page images, the portion images and the segmented images.

Nevertheless, the image portions and the segments can be automatically retrieved by indexing the coordinates.

A file is also created for the images which may be transformed into ASCII code after optical character reading.

As there is a considerable volume of digital data, after everything has been processed the next step is the final data compression process.

As will be seen in greater detail hereafter these various files may be managed by a mainframe data base (Bq, FIG. 1).

Figure 2A:
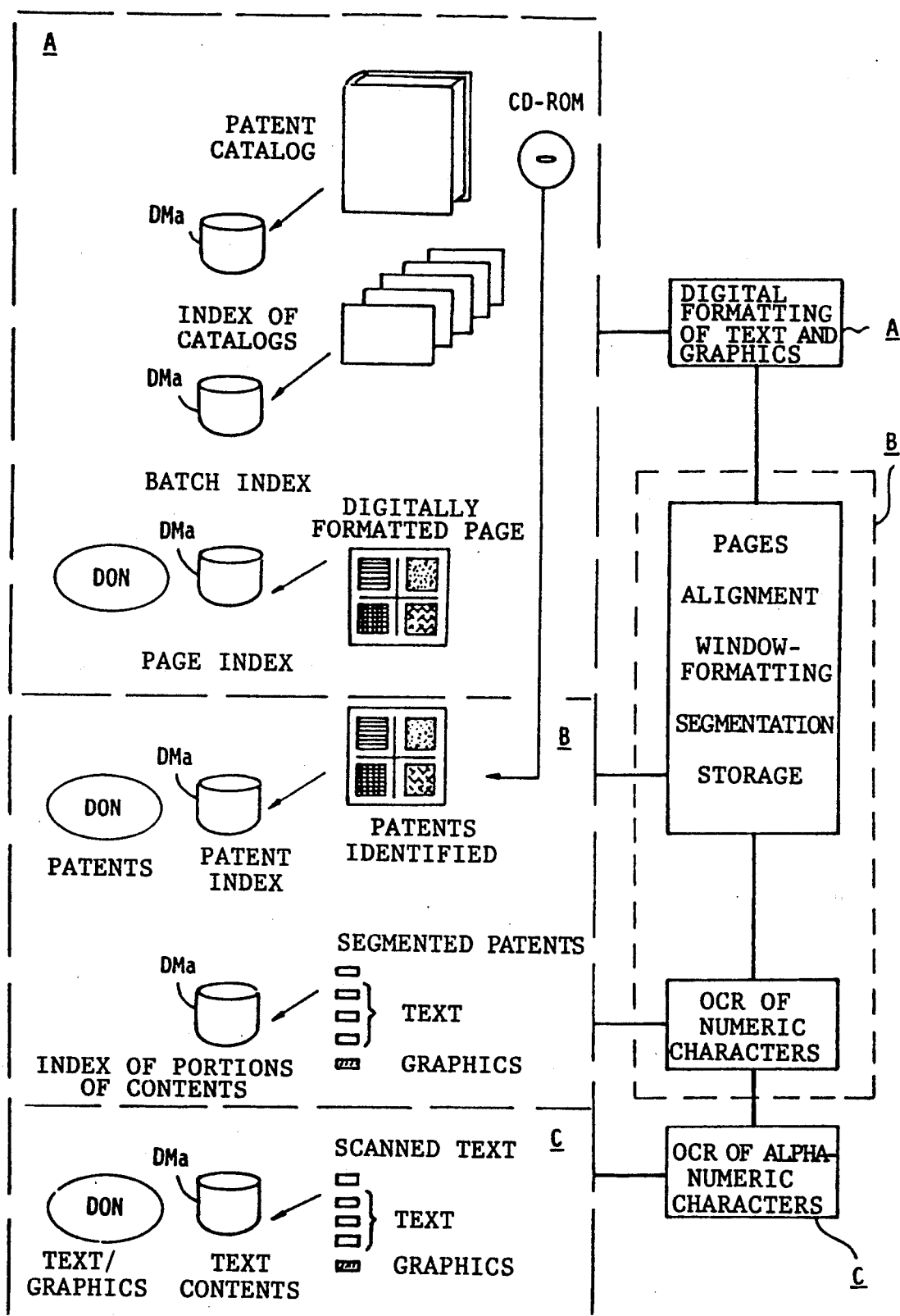
FIGS. 2A and 2B show the physical sequence of the various steps in the process.
Figure 2B:
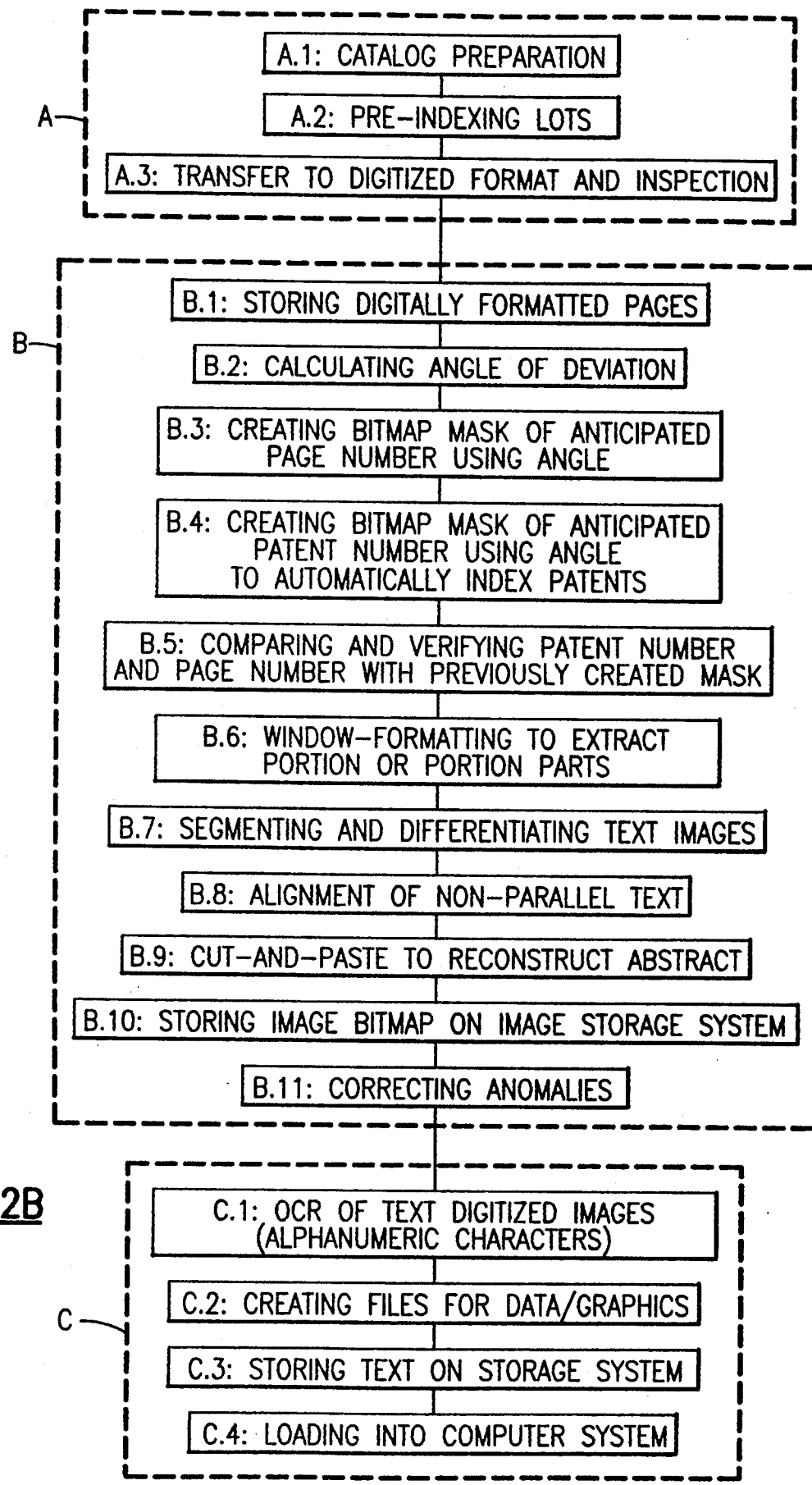

A more concrete and more detailed description of the various steps in the process follows, taken in conjunction with the schema of FIGS. 2A and 2B.

The method comprises three essential steps:
A: digitized formatting
B: processing and reading page numbers and patent numbers;
C: optical character reading of text.

All these processes can occur in real time.

Step A includes sub-steps A.1, A.2 and A.3 for catalogs and only sub-step A.1 when using a CD-ROM or other storage media.

A.1: catalog preparation: the catalogs, still bound, are treated with lead oxide and prepared for digitizing. These catalogs are separated into batches for digitizing, each comprising a portion of the catalog pages. As inspection pattern is inserted into each batch in order to verify scanner adjustment. Treating the pages with lead oxide permits one batch to be automatically digitized using the automatic frontal page insertion device, if its exists. "Valuable" books will be digitized "opened flat" on the scanner. However, the pages will curve upward from the book binding and cause aberrations in the digitized image, as the document will not have been digitized in a completely flat position. After numbering and validation, the books will be rebound by a binder;

A.2: pre-indexing lots: this refers to inputting identifying data from the catalog as the number of pages, the number from the first to the last patent, etc.;

A.3: transferring the data into digitized format and inspection: this refers to the digitized formatting process per se of the catalog pages, associated with optical page number recognition, with the position of the number on the page depending upon the type and data of publication.

Step B comprises the following sub-steps:
B.1: storing the digitally formatted pages as scanned.

This file is the exact reflection of all the pages of the digitized document. The pages including descriptive abstracts will undergo the following processes. The others will serve as complementary verification during step C: for example, the name of the inventor is located in the abstract and in the summarizing tables, which will provide verification backup;

B.2: calculating the angle of deviation.

The scanner may be used in two ways:

automatically inserting the pages which will be successively digitized;

or manually positioning the pages to be digitized on the scanner window.

Figure 4A:
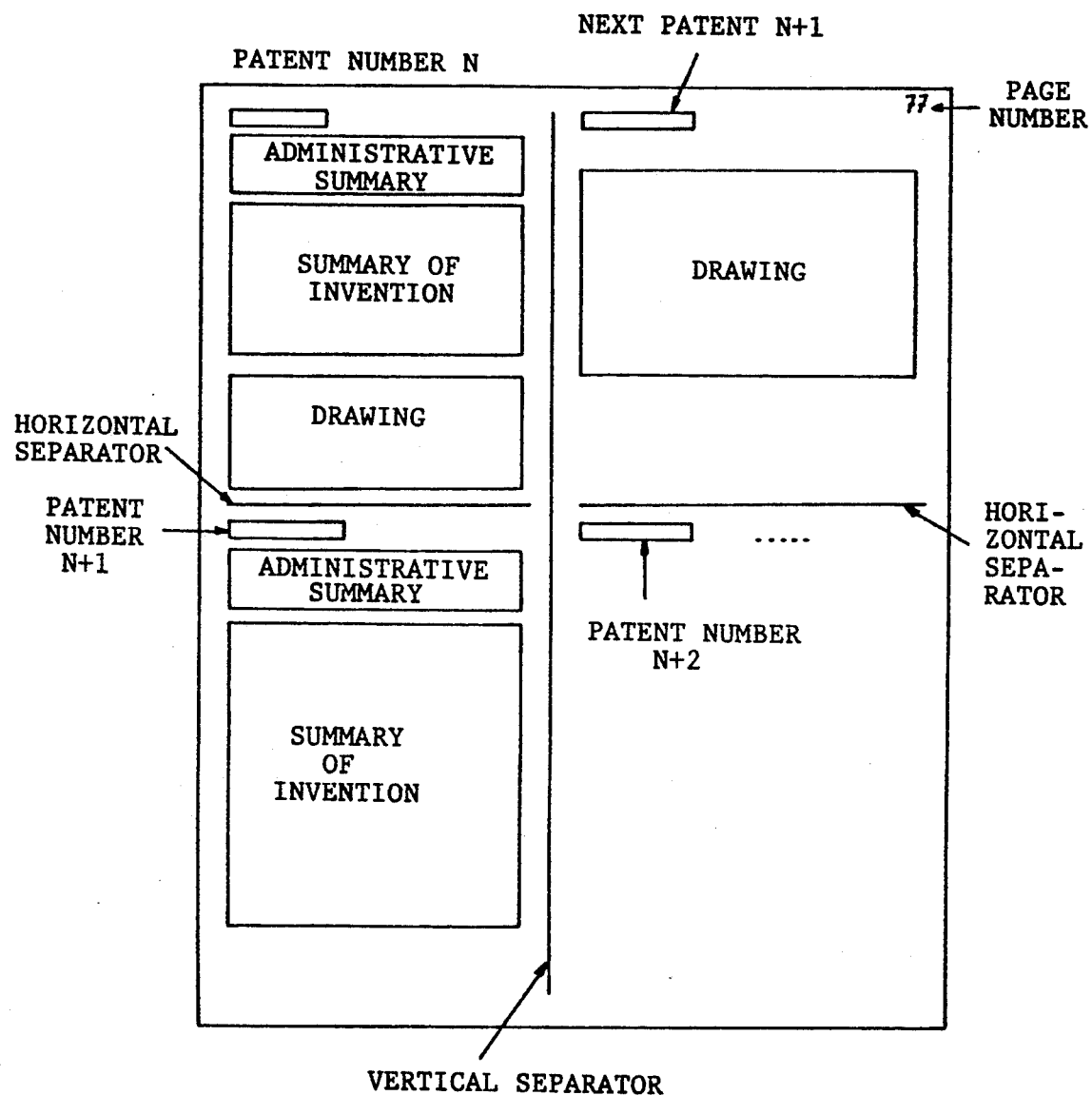
FIGS. 4A and 4B are schematic illustrations of the characteristic elements used to correct irregularities in the horizontal and vertical alignment of lines of text on one digitized page of the *BOPI* or one page of the *Official Gazette;*
Figure 4B:
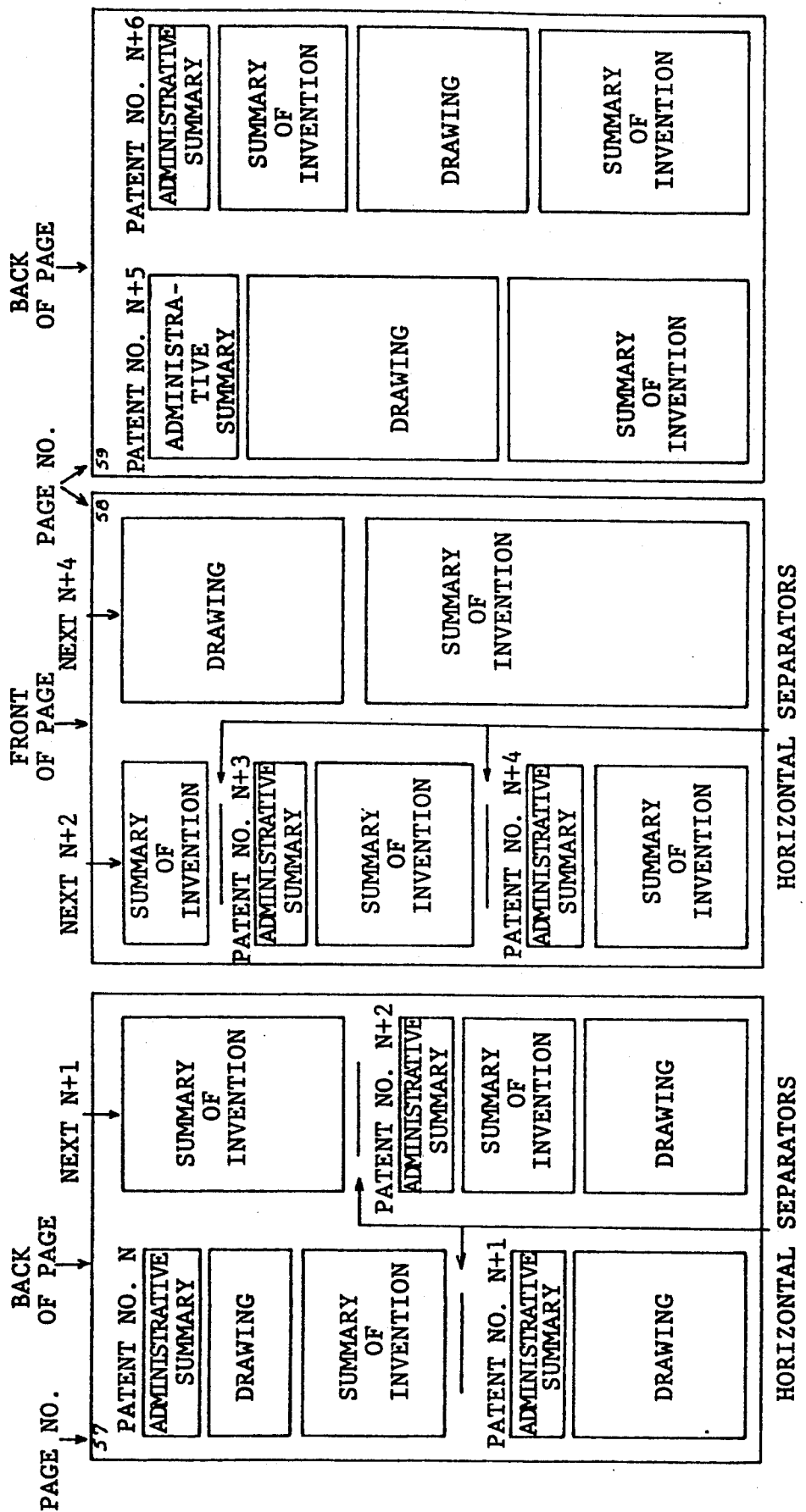

In both cases the lines of text can be digitized if they are not parallel to the scanner's point of origin, either because the paper is not properly fed (paper fed crookedly) or because the paper has been incorrectly positioned on the window, or because the lines of text in the document to be digitized are not parallel to edges of the document. The resulting angle, hereinafter referred to as the "angle of deviation", is generally calculated in relation to a particular reference point on the document to be digitized, or lacking that, by a line consisting of the lower portions of certain characters as shown in FIGS. 4A and 4B;

B.3: creating from the "Bitmap" mask the anticipated page numbers by allowing for the angle or OCR.

Generally the rules of pagination for a document are precise and are known (alternate page numbering, headers, footers . . . ). The documents to be digitized are also known. As a result, the position of the page numbers is also known. Therefore it is possible to extract from the digitized page a small window comprising the numbering system for the digitized page in progress;

B.4: creating from the "Bitmap" mask the anticipated patent numbers by allowing for the angle in order to automatically index patents, or OCR.

We are also familiar with the rules for patent numbering. For each type of publication to be digitized, it is possible to deduce from examination thereof the rules for determining the physical location of the patent number on the page, as shown in FIGS. 4A and 4B. For example, in the *BOPI*, the 18-month publication number is the first information in the abstract and four abstracts are usually printed on one page.

Similarly, in the *Official Gazette*, a short horizontal dash separates two abstracts. The patent number will generally be below this dash.

After analyzing what type of document is to be digitized, it is generally possible to deduce with certainty where the patent application number or numbers will be found on the page.

As before, we can extract from the digitized page the corresponding "Bitmap" window or windows.

B.5: comparison and verification of page number or patent number with previously created mask.

We know in advance the rules for creating patent numbers. For example, in the *BOPI*: from a certain date forward, the first publication numbers increase by an increment of one each time. Knowing the character font, it is thus easy to create the "Bitmap" image of the next publication number and compare it with that extracted from the digitized document in process, simultaneously taking into account the angle of deviation. The same is true for page numbers which are generally sequential. Thus, by allowing for the angle of deviation, the "Bitmap" image for page numeration can be created. Comparison between the anticipated page number and the anticipated patent number detects errors at this level. Such an error may result from missing pages, a patent sequence numbering error or poor digitizing or mediocre quality of the digitized document. For the first time, the ambiguity can be eliminated by an OCR softward program. In other situations, visual examination will be necessary.

B.6: Window-formatting to extract portions or parts of portions.

We will now extract everything concerning the various portions comprising the abstract or abstracts on the digitized page. Window-formatting allowing for the angle of deviation allows the various portions concerning a particular abstract to be extracted from the digitized page. Actually, we know the beginning and the end of this abstract. The parasitic contours made up of insignificant pixels will be eliminated.

B.7: Segmentation recognition text images.

The previously digitized and window-formatted "Bitmap" images are generally composed of fields comprising text and fields comprising one or more graphics. The segmentation computer program allows splitting by taking into account the angle of deviation between the fields of text and the fields of graphics.

B.8: Parallel alignment.

We have previously calculated the angle of deviation. We will now rotate for that number of degrees, in the correct direction, only the text fields of the abstracts concerning the current digitized page. The graphics fields will not undergo any rotation operation. By "text" we mean the contents, which may include formulas within the text.

B.9: Cut-and-paste to reconstitute the abstract.

The various text and graphics fields relating to the abstract will undergo a cut-and-paste operation in order to reconstitute the descriptive abstract according to our method.

B.10: Storage of "Bitmap" portion image on image storage media.

This storage is realized using the previously calculated indexing.

B.11: Treating anomalies according to process described.

Missing or inadequately digitized pages will be separately processed so as not to interfere with the progress of the digitizing procedure.

Step C

C.1: Optical reading of texts and verification: optical reading of the texts takes place for each field of each patent and creates a file which may be in ASCII code. Analysis of the character fonts also allows the fields in the title (patent title, applicant, etc.) to be indexed;

C.2: Creating files for data/graphics: this refers to creating files from the product of sub-steps B.7 and C.1 to format them for editing, on the one hand, and on the other hand, to associate them with the initial file image of the patent;

C.3: Storage of document images and data: the file images resulting from sub-step C.2 are stored in magnetic or digital optical media;

C.4: Loading into computer system: these files are then downloaded to a computer (onto magnetic discs in the case of text files, and onto digital optical or magnetic discs in the case of initial images of each patent or segmented files).

In accordance with one embodiment of the invention, a "bitmap" file is created from the digital information and an "ASCII-type" file from the optical character scanning of text and graphics. This ASCII file is backed up by means of appropriate glossaries and using the data in the summary tables.

According to another embodiment, since OCR is not 100% effective at text recognition, it is possible to save only the text presumed to be free of spelling errors in ASCII format and to save the unrecognizable or questionable characters in bitmap form, with the symbols and graphics also in bitmap form; this information is then linked together in a file so as to reconstitute the text in its original visual format.

This second embodiment is not the same as inserting a drawing or graphic as is the case in WORD-type graphics computer programs, but is an automatic linking of characters not recognized by OCR and saved in the form of field bitmaps.

A summary of these steps is given in FIG. 2B.

The characteristics of a preferred embodiment will now be defined in detail.

CHARACTERISTICS OF DIGITAL FORMATTING

Since gazettes are printed on double-sided paper, a front and back page scanner is used for the scanning operation. A one-sided scanner can be used, which would necessitate two digitizing processes, the first for the right hand pages and the second for the reverse sides, scanning takes place in black and white, that is, with the binary method, as the elementary pixel is black or white. Publications are monochromatic and have drawings based upon dashes, thus black and white digitizing conserves considerable space (presence or absence of one pixel). If a drawing has a range of shades or colors, it is necessary to specifically code several bits.

adjusting brightness and contrast in digital formatting takes into account various paper colors and the impression of the characters and drawings, which may be lighter or darker from one page to the next (variable detection thresholds). If the scanner does not have this capability, then a detector is added (for example, a camera). This detector controls brightness correction by the scanner.

in view of the large volume of sheets to be read into digitized format, a scanner with automatic or semi-automatic feed is preferably selected; it must also be capable of digitizing paper of varying thicknesses; the number of pages to be processed in batches depends upon the paper feed device and scanner receiving capability;

digital formatting uses the degree of bit precision required by the size of the characters and the drawings to be digitized, i.e., at least 400 dpi (16 points/mm) to ensure sufficient document legibility and a sufficient OCR performance level;

digital formatting is performed on batches of pages from each publication; each publication is treated with lead oxide; the original page order is maintained so the volumes can ultimately be reconstructed and rebound. It is possible to digitize batches not treated with lead oxide. However, variations will result due to book bindings and the direction in which the document pages are presented, i.e., right page or left.

Compression of Bitmap Images

Processed and digitally formatted images are finally compressed so that each datum (portion) occupies disc space amounting to a minimum of eight kilobits.

To achieve this, depending upon the type of document, text is generally saved at 300 dots per inch and drawings (more detailed) are saved at 400 dots per inch.

This unit is compressed at a higher performance format than CCITT Group 4. An effective compression rate of 50 per 11 million portions yields, for example, a global size of approximately 100 Giga bytes.

Various methods using this kind of compression are known today, one of which is the wave method.

Conversion allows use of standard compression algorithms (CCITT Group 3 or 4).

The method must not, of course, cause image quality to deteriorate due to pixel loss.

Image compression is not proportionate to the square of resolution because the black text portions and the drawing are represented by more pixels, while the white portions remain constant.

Pre-Indexing Publications

Each publication is pre-indexed in the data base using the following criteria:
publication name,
publication date,
total number of pages (when applicable),
range of patent numbers (when applicable), i.e., numbers of first and last patent included,
characteristics of the publication (according to defined structures such as page size and format, patent separators, whether patents are consecutive, whether arranged in increasing order, whether classified by number or by subject matter, whether single or multiple patents, etc. . . . ), such information having been previously loaded into the system and displayed in simple format for the operator's control and possible modification according to the data in the catalogs.

The program verifies at this point whether the publication has already been processed.

In the case of certain documents, it is possible that one or more different summaries in the same language exist for a single invention. These various summaries are included one after the other.

Selecting Batches to be Input and Pre-Indexed

Each publication forms one or more batches to be input (certain publications are nearly a thousand pages long). Each batch is selected according to how it can be fed into the scanner, for example, 50 double-sided pages. Each batch is numbered.

As used hereafter the term batch means batch for digitizing.

For each batch, before transposition to numeric format, the following information is input when available:
number of first page,
number of last page,
number of first patent,
number of last patent.

The procedure also verifies in real time that these values are legitimate (page numbers not overlapping what has already been input and corresponding exactly to the range established for the publication; also patent numbers according to the range defined for the publication and not processed in prior batches).

Pre-indexing also provides information about portion numeration. This information can serve as a control for the OCR step which can automatically index a digitized document. This OCR step will recognize the digitized format of the portion numbers. This dual control generally eliminates the possibility of collision.

Automatic indexing does not require insertion of document index references before each document, a step which is usually necessary when a batch of documents is to be digitized.

In this way, human error is virtually eliminated as there is no manual document selection or feeding.

During pre-indexing the publication data is input only once for the entire publication. Thus, the data base is enlarged reliably and automatically.

Inspecting Page Numbers

After digitizing and possible aligning, the method provides for either a mask or an OCR technique to read the number on each page of the publication, the characteristics of which are known for each publication to be processed:

its placement on the page (physical location),
the character font used.
Recognition is verified using the following criteria:
numbers on successive pages;
numbers on pages actually included in the range of page numbers within the batch.

If pages are missing, the method identifies the missing pages and creates a file listing the missing pages by publication.

Automatic Window-Formatting

Window-formatting is done to automatically extract from a digitized page all the data concerning a particular patent so that the initial descriptive abstract can be reconstructed on only one page. In a gazette this abstract may occupy two columns, or one portion may be on the left hand page and one on the right, or it may bridge two pages.

For example, in the *BOPI* four patents are generally printed on a page or eight patents to a page (without taking into account patents which may be continued on another page). In this case window-formatting consists of extracting the eight patents from this page. If a patent is continued, seven patents are extracted and the eighth, i.e., continued patent, undergoes a cut-and-paste procedure.

If a "smart scanner" is used, window-formatting will automatically select the zone representing the portion number.

Image Segmentation

The reason for segmentation is to locate in a bitmap file the different paragraphs comprising the text, either the administrative or summary portion of the patent. The criteria is either a skipped line or an incomplete line.

Another reason for segmentation is to locate the drawing in a bitmap file. Once this information is catalogued it is possible to edit a batch unit of patents by editing each paragraph or drawing and verifying whether the paragraph or drawing in process is sized to allow editing to take place within the column in process. If it is too large, the paragraph or drawing is printed in another column or on another page. The object of segmentation is to facilitate CAP operations when editing a personalized gazette.

Alignment Correction

Aligning orientation of the image or non-parallel lines is done so that each line of text (in bitmap form) is parallel to a reference point. Horizontal lines or dashes, etc. are preferably used (cf. FIG. 4A, 4B). This is done so the text (bitmap) can be automatically split between two printed lines within one abstract (portion) when editing. Realignment can be done vertically so that the beginning of each line is vertically aligned.

Furthermore, the next phase of OCR concerns transforming the bitmap text portion into ASCII code. The recognition rate is greatly improved when the lines of text are all disposed in parallel to a reference point.

This step also eliminates imperfectly parallel lines in the image caused by automatic paper feed into the scanner. Such imperfections interfere considerably with the CAP cut-and-paste operations.

The page, thus transformed to digitized format, is oriented using an alignment algorithm consisting of effecting two image transformations which result in one rotation (or the equivalent) at the desired angle, one vertical and the other horizontal, along the lines and the columns, this takes place automatically. The angle desired is documented in relation to a horizontal reference point consisting of the dashes separating the patent abstracts on the page.

Correcting imperfectly parallel lines takes place only after a rotation of perhaps 90° or 270° due to the direction in which paper is fed into the scanner.

Deviation tolerance is one pixel. This provides a tolerance of imperfectly parallel lines which varies according to the length of the reference dash. For example, in the *Official Gazette* (U.S.) where the reference dash measures about 20 millimeters, calculation shows a maximum 0.2 degree parallelism error, or a quarter of a millimeter for an 80 millimeter wide column. The other documents have a much wider reference point.

If the reference point is not clearly printed, then the reference point becomes the two extremities of the dash.

However, the thickness of the reference point must be compatible with scanner resolution, which imposes the requirement that for scanning at 400 dots per inch resolution, the reference dash must be a minimum of 1/16th millimeter thick. For example, the dash separating patents in the *Official Gazette* is a minimum of 3/16 millimeter thick, which corresponds to three pixels.

This correction procedure does not apply to graphics.

The Method Provides Additional Quality Control

Various quality control mechanisms are incorporated into the series of digital formatting, reorientation and window-formatting operations.

1. Control During Digital Formatting Procedure

Quality control during the digital formatting procedure is accomplished as follows:

digital formatting with a reference pattern inserted at the beginning and the end of each batch with an impression of the image in digital format, compressed, decompressed and printed; another method consists of automatic comparison between the image from the pattern inserted and the image previously as transposed to numeric format from the same pattern, thus automatically detecting whether a predetermined calibration error has been surpassed;

correcting the alignment of this pattern will also occur so the comparison will be more reliable;

taking a laser impression of two consecutive pages (double-sided) for every number N of double sided pages processed (with N being a parameter varying globally from 50 to 200);

displaying a zoom image on a control screen at the operator's option (enlargement factor of 2 for A3 using a 200 dpi screen, for example). The zoom image, which depends upon control screen resolution, is displayed once for every number P of front or back sides of pages processed.

When a flaw is detected by the operator (out-of-focus) or dirty pattern, defective printed or displayed pages), the batch is rejected and reprocessed. Depending upon the cause, the scanner is checked and adjusted by a maintenance operator.

2. Window-Formatting

Quality control of window-formatting takes place in two ways:
 systematically: by the impression of a page in numeric format and of the images of each patent read, for every number P of pages processed (P being a parameter varying from 50 to 200),
 indirectly, for certain publications where the patents occur in sequence, by control of the recognized patent numbers after OCR.

3. Recognition of Patent Numbers

Two types of control are possible:
 for publications which classify according to patent number, based on the fact that the numbers ascend or in certain publications, are successive;
 for publications which classify by subject matter, based on the fact that the numbers ascend by subject matter.

The unrecognized numbers or those recognized but with a degree of uncertainty as to parameters will be listed in a control file which the operator can call up for visual control, portion by portion.

The control procedure consists of making a logical comparison between the remaining numbers of the current patent number and the patent number deduced from the rules of patent numeration.

A double control procedure can be performed by OCR if there is a conflict.

Of course in this case, the OCR is limited to only digits (a maximum of ten error possibilities). Furthermore, the questionable tables are limited to several possibilities which can be resolved by studying curves and pixel weight.

If uncertainty remains despite this, it can be resolved by analyzing the pre-indexing tables. If further uncertainty persists, the control screen can zoom in on the questionable characters so the operator can manually select the correct character.

4. Realignment

Quality control during alignment is accomplished in two ways:
 by statistical calculation to determine for each batch of processed pages the distribution of the rotations which have taken place (around the hypothetical page axis: vertical or horizontal) batch on the one hand, and in addition, the same distribution for the entire publication processing procedure, as well as the mean and deviation values for each publication,
 by visual control of the images before and after rotation for rotation values exceeding established threshold parameters (around the hypothetical page axis).

5. Managing Batches to be Digitized

It is possible to determine the following information about the batches at any time:
 last operation performed (pre-indexing the publication, the batch, storing pages, window-formatting, etc. . . . ),
 status (beginning, in process, validated),
 beginning and ending time of each operation,
 operator and validator.

Editing

The digitally formatted patents can be laser edited into "gazette" form. Selecting the patents before creating the gazette can be done:
 on the basis of an ASCII file containing a list of patent numbers,
 on the basis of a sort operation performed on the data base by patent numbers, publication date or subject matter.

If when sorting by subject and publication date one prefers not to edit certain patents, it should be possible to automatically remove them from the gazette. For example, if for subject X a series E of 100 patents is found and one wishes to edit only 85 patents in series E, the 15 unwanted patents can be deselected simply by entering the patent numbers of by using a mouse to "click" on the 15 patents within the list of 100 patents selected.

The patents are preferably printed on a laser printer at 300 dpi.

Most of the publications include very detailed, small drawings which are difficult to read.

The method according to the invention improves drawing legibility with no image interpolation or aberration.

As an example, we will use a one inch square drawing. The drawing is represented by a 400 by 400 pixel matrix. If printed without prior processing on a 300 dpi resolution laser printer, one out of four pixels is lost.

Conversely, in accordance with the invention, the image is enlarged by printing the pixel unit using a 400/300 ratio.

Drawings which do not occupy all the space available also undergo zoom magnification at a power calculated automatically as a function of the margins.

Display

Document images are displayed on a high resolution screen (of the order of 100 DPI or preferably 200 DPI on a 19-inch screen, for example) with the ability to zoom in (variable up to four times actual size), rotate and displace the image using horizontal and vertical "scrolling".

Storage

Storing the page and patents images is done with 12-inch large capacity optical disks. Each optical disk is copied (backed up). The optical disks also comprise indexes so the contents can be restored if the disk drive is removed or there is a mechanical problem. Utilities provide for copying a file from optical disk to magnetic disk, from optical disk to magnetic tape, from optical disk to optical disk and so forth.

The OCR Phase

Phase C of the method consists of optical character reading of the texts of the descriptive patent abstracts. This operation covers several specific stages:
 character fonts are known for each catalog type; in the administrative data portion of the patent, they also correspond to different fields: title, applicant, inventor, etc. ..., optical character recognition yields endless ASCII text files a priori with no particular structure, to be loaded into an external data base; this is why an OCR (term explained on page 29) software program capable of recognizing different fonts is selected, which also facilitates structuring the data.

The Data Base May Be Operated by a Mainframe

Figure 3:
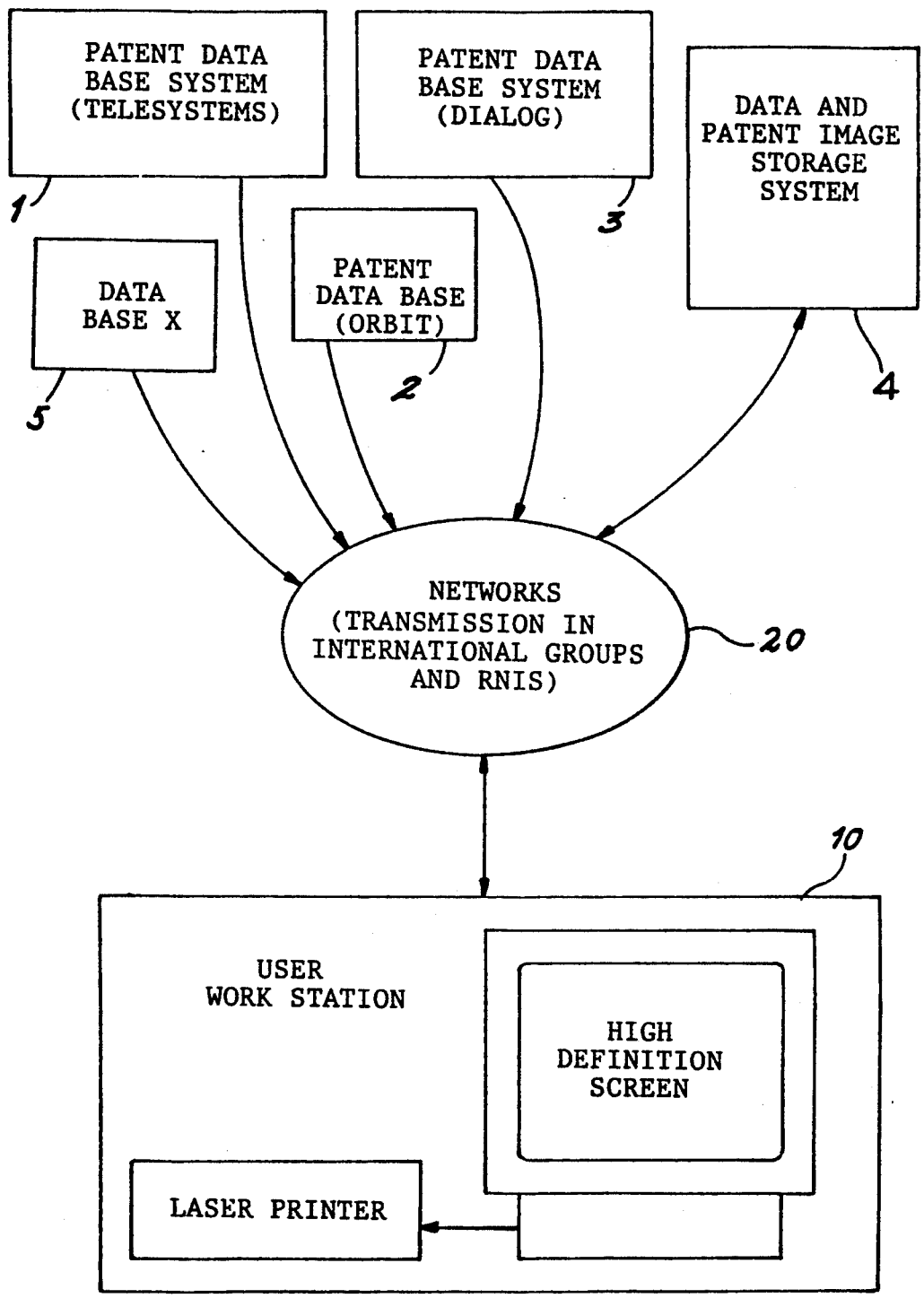
FIG. 3 is a schematic illustration of the architecture of a system for consulting a data base created according to the method of the invention.

The following description refers to the system architecture shown in FIG. 3.

After the initial reading-in of the publications, the files from the data bases and from the patent image documents and segmented patents are loaded into a mainframe for permanent storage (data on magnetic disk and images on large capacity optical disks: 2.3G Bytes per side, for instance) or large capacity reliable magnetic disks, for example, double density disks.

Thus the data base can be enhanced by the addition of textual data and administrative information.

User Work Stations (10)

The user work stations are similar to the consulting-/editing/printing stations associated with a conventional data search system and modem for "smart" remote access to a data base at mainframe (1) and complementary research terminals 2, 3, 4 and 5.

In conclusion, steps A and B of the method consist of digitally formatting a mass of documents to create a data base of image data.

In addition to this process, the catalog pages are divided into portions and optical character reading (OCR) of the patent numbers only takes place.

Each patent, identified by number, is associated with the digitized image of the initial page comprising the textural elements (administrative data and summary) and the drawing.

Based on the digitized image associated with each patent, step C extracts the textural information and analyzes it to determine what elementary data will be included in the documentary textural data base.

This data base provides for documentary research and can be searched by key word; its actual function is to complement to the image data base created by steps A and B.

The global data base—text and images—comprised of A, B and C is preferably archived on a mainframe 4 (FIG. 3).

Figure 5:
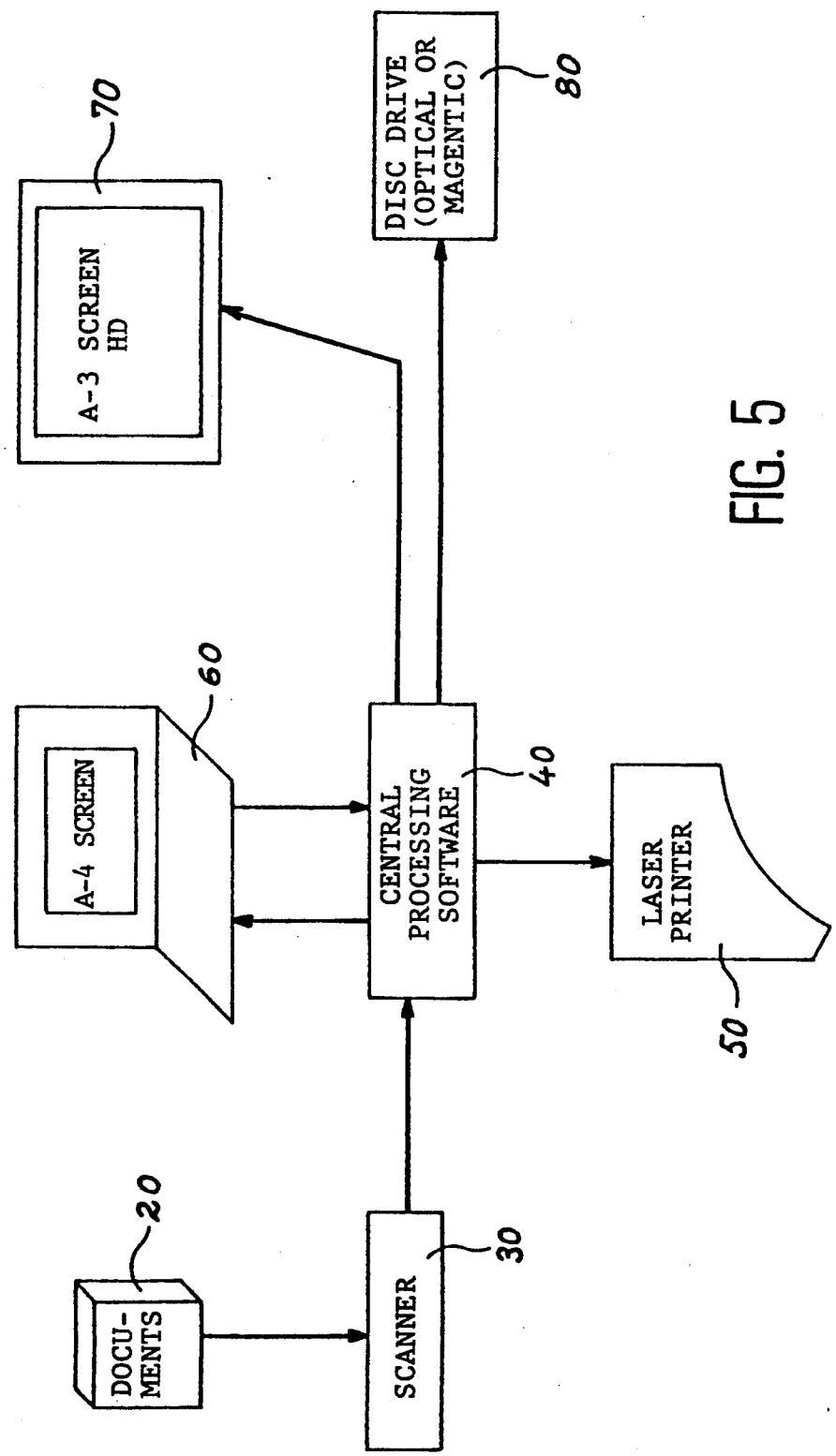
FIG. 5 shows a device implementing the exemplary embodiment.

Steps A, B and C of the method for processing alphanumeric and graphics data according to the invention can be implemented by means of the apparatus shown in FIG. 5. This apparatus comprises the following functional units:

a sub-system for digitally formatting documents comprising a work station including a rapid scanner, a high resolution screen and a laser printer, a sub-system for processing digital images, a sub-system for document storage, i.e., storing file images on optical disks, on magnetic disks and large capacity media for the data base, a sub-system for consulting, editing and printing documents consisting of a work station with a high resolution screen, a laser printer and access to the data bases through a compatible network, for example, a telecommunications network or RNIS or Numeris.

The sub-system concept here is hypothetical and does not necessarily require separate equipment.

From a structural point of view, the apparatus comprises:

a scanner 30 for digitally formatting documents 20, a computer with a central processing unit and softward 40 for processing the digitized images (rotating, aligning, splitting, OCR, CAP . . . ), a screen 60 for tracking via softward capable of visual output the digitized images, processed and on pages, in gazette form, an optical drive 80 or magnetic disk drive (for storing bitmap images), a laser printer 50 (for printing gazettes, bitmap images, . . . ), For step C, the equipment also includes:

a mainframe data base for storing the textual references from the patents, storage hardware for document images, consultation/editing work stations for system users similar in function to the editing/printing work stations for steps A and B, except they have softward for accessing networked data bases such as Telesystems-Questel, Orbit-Pergamon, Infoline, and Dialog, in particular.

FIG. 3 provides a schematic overview of how the entire system is used (the method and equipment required):

from the consultation "user work station" 10 the user interrogates the patent-data data base (Telesystems-Questel, etc.) and locally stores the numbers of patents pertinent to the research. The user also has the option of interrogating the documentary data base using all the words in the patent abstracts which have been permanently stored in device 4, thereby obtaining an additional list of patent numbers pertinent to the research, he/she then decides whether to use the patents in image form and whether or not to save them in the batch thus created by simply selecting patent numbers from the batch list, he/she then decides whether to edit these patents to create a "personalized" catalog. In this case, he/she downloads the pertinent patents in format for editing, edits them and produces a "gazette" (a catalog comprising the texts of the descriptive abstracts and associated drawings); this gazette may be printed on a laser printer linked with the work station (or it may be referred to an outside printing service).

To ensure that the data base is uniform, various patents from the same family are stored together in the data base. This allows the user to choose among members of that family. In addition, the same document may be stored in both French and English for editing at the user's option. PCT gazettes are in two languages, French and English. PCT gazettes written in English are stored in the data base to provide a multi-lingual data base (at a minimum French, British and U.S. English).

We claim:

1. Method for processing page form documents, said documents comprising discrete information portions, each of said portions comprising text and graphic fields, to create a data base stored in a computer system of digital representations of said page form documents which can be searched and edited, comprising the following steps:

A. creating digitally formatted documents in bitmap form comprising digital representations of said page form documents;

B. a first processing phase comprising the steps of:
(1) identifying characteristic elements of each page of said page form documents in order to verify correct pagination of said digitally formatted documents, (2) determining by calculation what angle of rotation must be applied to properly orient each text field of each digitally formatted document for subsequent Optical Character Recognition conversion of said text fields, (3) creating a bitmap mask of said characteristic elements of each page of said page form documents, while allowing for said angle of rotation, (4) identifying said characteristic elements on each digitally formatted document in order to compare and verify said characteristics with said bitmap mask, (5) window-formatting said digitally formatted documents to separate the text and graphics fields each of said portions into blocks of digital information which can be separately accessed, (6) segmenting said blocks to distinguish text and graphics fields so that said fields may be separately stored, (7) correcting and aligning only said text fields by taking into account said angle of rotation to create aligned text fields, (8) reconstructing said digitally formatted documents from said aligned text fields and graphics fields so that each portion of said digitally formatted documents may be separately stored, (9) storing said digitally formatted documents, each portion of said digitally formatted documents, said blocks of digital information which can be separately accessed, and said text and graphic fields, in files which can be edited, and

(10) manually correcting errors of digitization, pagination, indexing, segmenting and alignment, and C. a second processing phase comprising Optical Character Recognition conversion of characters contained within said aligned text fields and storing said characters in a file which can be searched.

2. A method according to claim 1, characterized in that step A further comprises pre-indexing steps of (a) determining the number of pages in each of said digitally formatted documents, and (b) determining characteristic elements of first and last portions in each of said digitally formatted documents.

3. A method according to claim 1, wherein each of said portions comprise text and graphics fields arranged in lines and columns, characterized in that step B(7) comprises making two image transformations to achieve rotation through said angle of rotation, one vertical, the other horizontal, so that there is variable spacing along said lines and columns.

4. A method according to claim 1, wherein said graphics fields are digitally compressed at end of step B.

5. A method according to claim 1, wherein said page form documents comprise printed catalogs, and wherein step A includes the step of automatically digitizing into bitmap form pages of said printed catalog by scanning.

6. A method according to claim 1, wherein said page form documents comprise digitally compressed magnetically stored pages, and wherein step A includes decompressing said images.

7. A method according to claim 1, wherein said page form documents comprise printed catalogs and said portions comprise patent abstracts, and wherein said characteristic elements comprise administrative information for each of said patent abstracts.

8. Apparatus for processing page form documents, said documents comprising discrete information portions, each of said portions comprising text and graphics fields, to create a data base stored in a computer system of digital representations of said page form documents which can be searched and edited, said apparatus comprising:

a. means, including scanner means, for creating digitally formatted documents in bitmap form comprising digital representations of said page form documents;

b. a computer for controlling said scanner;

c. means for identifying characteristic elements of each page of said page form documents in order to verify correct pagination of said digitally formatted documents;

d. means for determining by calculation what angle of rotation must be applied to properly orient each text field of each digitally formatted document for subsequent Optical Character Recognition conversion of said text fields;

e. means for creating a bitmap mask of said characteristic elements of each page of said page form documents, while allowing for said angle of rotation;

f. means for identifying said characteristic elements on each digitally formatted document in order to compare and verify said characteristics with said bitmap mask;

g. means for window-formatting said digitally formatted documents to separate the text and graphics fields each of said portions into blocks of digital information which can be separately accessed;

h. means for segmenting said blocks to distinguish text and graphics fields so that said fields may be separately stored;

i. means for correcting and aligning only said text fields by taking into account said angle of rotation to create aligned text fields;

j. means for reconstructing said digitally formatted documents from said aligned text fields and graphics fields so that each portion of said digitally formatted documents may be separately stored;

k. means for storing said digitally formatted documents, each portion of said digitally formatted documents, said blocks of digital information which can be separately accessed, and said text and graphics fields, in files which can be edited;

l. means for manually correcting errors of digitization, pagination, indexing, segmenting and alignment, said manual correction means including a visual graphics display console;

m. means for Optical Character Recognition conversion of characters contained within said aligned text fields and for storing said characters in a file which can be searched;

n. a sub-system for archiving and searching said data base; and o. a laser printer.

9. Apparatus according to claim 8, further comprising a transputer system.

10. Apparatus according to claim 8, wherein said laser printer has a video interface.

* * * * *

UNITED STATES PATENT AND TRADEMARK OFFICE
CERTIFICATE OF CORRECTION

PATENT NO. : 5,319,745
DATED : June 7, 1994
INVENTOR(S) : Vinsonneau et al

It is certified that error appears in the above-indentified patent and that said Letters Patent is hereby corrected as shown below:

Claim 1, Col. 19, line 32, "graphic" should be --graphics--

Claim 1, Col. 19, line 35, after alignment delete "," and insert --;--

Signed and Sealed this

Third Day of October, 1995

Attest:

BRUCE LEHMAN

*Attesting Officer*     *Commissioner of Patents and Trademarks*